United States Patent
Mizuno et al.

(10) Patent No.: US 10,712,882 B2
(45) Date of Patent: Jul. 14, 2020

(54) OPERATIONAL INPUT DEVICE

(71) Applicants: KABUSHIKI KAISHA TOKAI RIKA DENKI SEISAKUSHO, Aichi (JP); TRAM, INC., Plymouth, MI (US)

(72) Inventors: Shintaro Mizuno, Plymouth, MI (US); Hidetaka Nomura, Aichi (JP)

(73) Assignees: KABUSHIKI KAISHA TOKAI RIKA DENKI SEISAKUSHO, Aichi (JP); TRAM, INC., Plymouth, MI (US)

( * ) Notice: Subject to any disclaimer, the term of this patent is extended or adjusted under 35 U.S.C. 154(b) by 0 days.

(21) Appl. No.: 15/892,427

(22) Filed: Feb. 9, 2018

(65) Prior Publication Data
US 2019/0250730 A1     Aug. 15, 2019

(51) Int. Cl.
| | | |
|---|---|---|
| G09G 5/00 | (2006.01) | |
| G06F 3/044 | (2006.01) | |
| G06F 3/0362 | (2013.01) | |
| G06F 3/0488 | (2013.01) | |
| G06F 3/0484 | (2013.01) | |
| G06F 3/0487 | (2013.01) | |

(52) U.S. Cl.
CPC ............ *G06F 3/044* (2013.01); *G06F 3/0362* (2013.01); *G06F 3/0484* (2013.01); *G06F 3/0487* (2013.01); *G06F 3/0488* (2013.01); *G06F 3/04847* (2013.01)

(58) Field of Classification Search
CPC ...... G06F 3/044; G06F 3/0362; G06F 3/0484; G06F 3/0488; G06F 3/02; G06F 3/0202; G06F 3/048; G06F 3/0312
USPC .................................................. 345/173, 184
See application file for complete search history.

(56) References Cited

U.S. PATENT DOCUMENTS

| | | | | |
|---|---|---|---|---|
| 2011/0175894 A1* | 7/2011 | Wakimoto | ........... | G09G 3/3648 345/212 |
| 2016/0231772 A1* | 8/2016 | Huang | ..................... | G06F 1/163 |
| 2017/0321367 A1* | 11/2017 | Kim | ......................... | D06F 33/00 |
| 2018/0373350 A1* | 12/2018 | Rao | ......................... | B60K 37/02 |

FOREIGN PATENT DOCUMENTS

JP     2003-043175 A     2/2003

OTHER PUBLICATIONS

International Search Report and Written Opinion of the International Searching Authority dated May 6, 2019 in International Application PCT/US2019/016710.
Land Rover USA: "Range Rover Velar 18MY | Touch Pro Duo Climate Control | Land Rover USA", YouTube, Aug. 2, 2017 (Aug. 2, 2017), pp. 1-1, XP054979315, Retrieved from the Internet: URL:https://www.youtube.com/watch?v=Wj857_eHVHE [retrieved on Apr. 23, 2019].

* cited by examiner

*Primary Examiner* — Jennifer T Nguyen

(57) ABSTRACT

An operational input device includes an operational portion located on a display screen of a display panel and a controller that determines whether or not the operational portion is being operated and controls display of functional information associated with the operational portion based on the determination. The controller displays the functional information on a first region of the display screen defined inside the operational portion when the operational portion is not being operated. The controller displays the functional information on a second region of the display screen defined outside the operational portion when the operational portion is being operated.

19 Claims, 6 Drawing Sheets

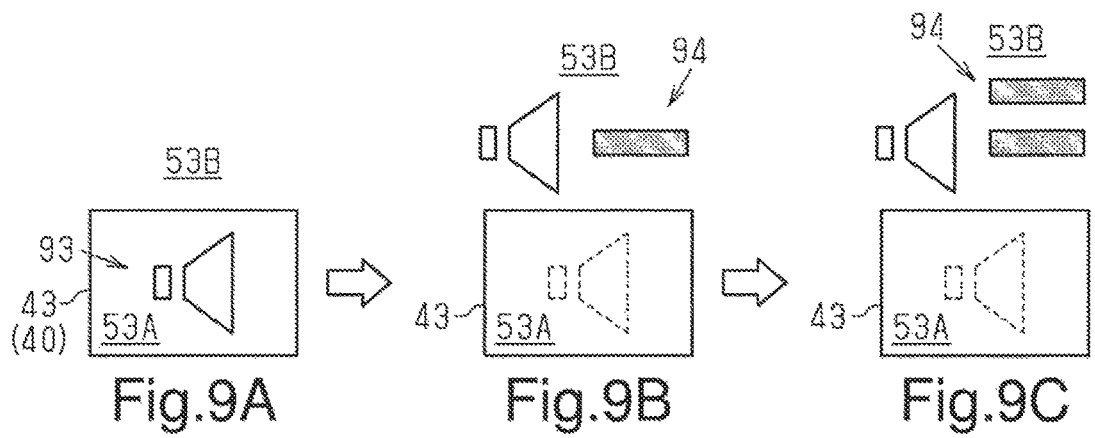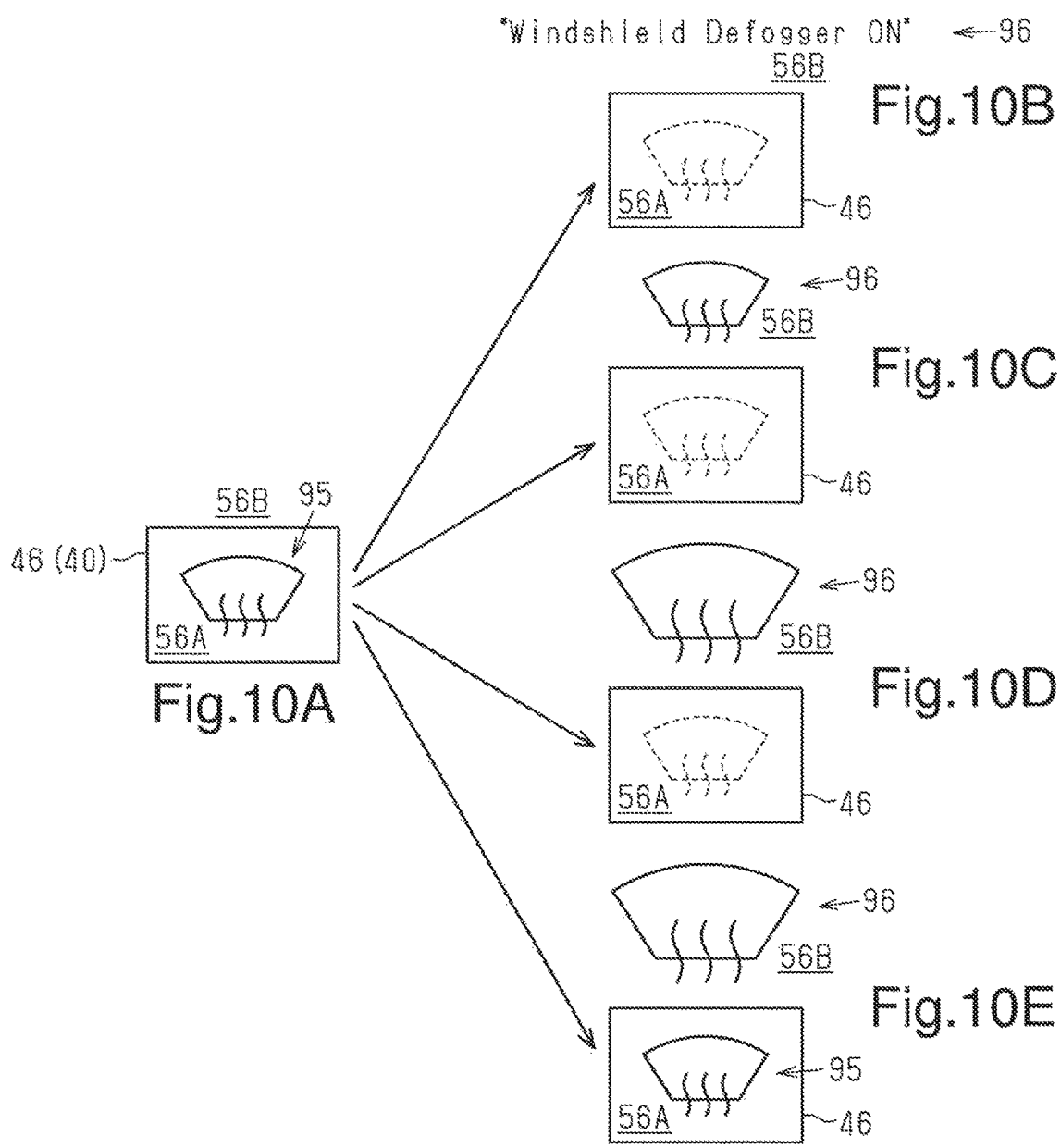

OPERATIONAL INPUT DEVICE

FIELD

This disclosure relates to an operational input device, particularly, to an operational input device that controls the contents displayed on a display screen based on operation of an operational portion.

BACKGROUND

A typical electronic device includes a display panel and an operational input device. The display panel is incorporated in an operation panel of the operational input device. The operational input device includes operational portions such as rotary-type operation knobs or push-type buttons and a controller that controls the contents displayed on a display screen of the display panel based on an operation input performed by the user with the operation portion. Japanese Laid-Open Patent Publication No. 2003-43175 describes one example of a conventional operational input device. In the publication, operational portions formed from a transparent resin material are arranged on a display screen. Substantially the entire region of the display screen, which includes the regions of the operational portions, is used as a display region. Thus, the displayed contents may be changed over the entire display screen using the display screen as wide as possible.

SUMMARY

In the conventional operational input device, the display control function is insufficient in terms of operational convenience and operational satisfaction. One of the challenges of performing display control is how to intuitively and effectively provide the user with functional information associated with the operational portions. Functional information is associated with a function accomplished by a device actuated in cooperation with the electronic device that includes the operational input device. For example, if the operational input device includes multiple operational portions, it will be difficult for the user to intuitively recognize the operation portion corresponding to the functional information displayed on the display screen. As another example, when the user operates an operational portion, the corresponding functional information on the display screen may be hidden by the hand or fingers of the user. In such a case, the user may not be able to sufficiently recognize the displayed contents (e.g., function set value or the like). Accordingly, there is still room for improvement in the dramatic display control executed by the operational input device in terms of increasing operational convenience and operational satisfaction.

One embodiment is an operational input device. The operational input device includes an operational portion located on a display screen of a display panel and a controller that determines whether or not the operational portion is being operated and controls display of functional information associated with the operational portion based on the determination. The controller displays the functional information on a first region of the display screen defined inside the operational portion when the operational portion is not being operated. The controller displays the functional information on a second region of the display screen defined outside the operational portion when the operational portion is being operated.

Another embodiment is a controller for an operational input device. The controller includes a means for determining whether or not an operational portion located on a display screen of a display panel is being operated and a means for controlling display of functional information associated with the operational portion based on the determination of whether or not the operational portion is being operated. The means for controlling display of functional information displays the functional information on a first region of the display screen defined inside the operational portion when the operational portion is not being operated. The means for controlling display of functional information displays the functional information on a second region of the display screen defined outside the operational portion when the operational portion is being operated.

A further embodiment is a non-transitory computer readable storage medium that stores one or more programs executable by one or more processors. The one or more programs include instructions causing the one or more processors to perform determining whether or not an operational portion located on a display screen of a display panel is being operated, displaying functional information associated with the operational portion on a first region of the display screen defined inside the operational portion when the operational portion is not being operated, and displaying the functional information on a second region of the display screen defined outside the operational portion when the operational portion is being operated.

Other embodiments and advantages thereof will become apparent from the following description, taken in conjunction with the accompanying drawings, illustrating by way of example the principles of the invention.

It is to be understood that both the foregoing general description and the following detailed description are exemplary and explanatory and are not restrictive of the invention, as claimed.

BRIEF DESCRIPTION OF THE DRAWINGS

The embodiments, together with objects and advantages thereof, may best be understood by reference to the following description of the presently preferred embodiments together with the accompanying drawings in which:

FIGS. 9A to 9C are diagrams illustrating another example of the display control of functional information; and FIGS. 10A to 10E are diagrams illustrating various examples of the display control of functional information.

DESCRIPTION OF THE EMBODIMENTS

Figure 1:
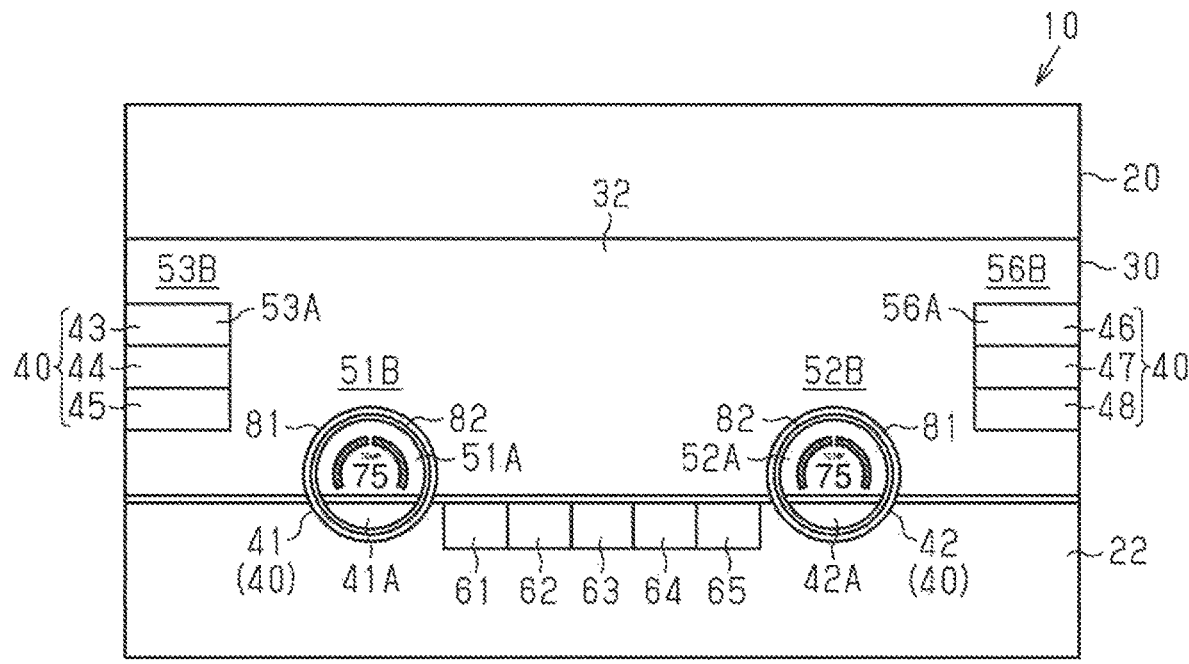
FIG. 1 is a schematic diagram illustrating an example of the outer appearance of an electronic device including an operational input device according to one embodiment.

Embodiments will now be described with reference to the accompanying drawings. Elements in the drawings may be partially enlarged for simplicity and clarity and thus have not necessarily been drawn to scale. To facilitate understanding, hatching lines may not be illustrated.

FIG. 1 illustrates an example of the outer appearance of an electronic device 10 including an operational input device 20 according to one embodiment. For example, the electronic device 10 is an on-board display device for a vehicle and includes the operational input device 20 and a display panel 30. The electronic device 10 is not limited to an on-board display device, and the operational input device 20 may be applied to any other electronic device. The display panel 30 may be any type of display panel such as an LCD panel or an organic EL display panel.

The operational input device 20 includes an operation panel 22 incorporated in the display panel 30 and operational portions 40 located on a display screen 32 of the display panel 30. The operational portions 40 are used to operate various types of on-board devices (vehicle functions) such as an on-board air conditioner, an on-board audio device, or an on-board navigation device. The operational input device 20 drives the display panel 30 based on a user operation input to display functional information associated with each operational portion 40 on the display screen 32. Functional information is information associated with a function accomplished by a device (in the present example, on-board device) actuated in cooperation with the electronic device 10 that includes the operational input device 20. The functional information may be displayed as a graphic display including at least one of characters, numbers, graphics, and marks.

In the example illustrated in FIG. 1, the operational portions 40 include two operation knobs 41 and 42 and six operation buttons 43 to 48. The operation knobs 41 and 42 are ring-shaped rotary-type knobs (dials) and can be rotated on the display screen 32. The operation buttons 43 to 48 are plate-like push-type buttons and can be pushed on the display screen 32.

The functional information associated with the operation knob 41 is displayed in at least one of an inner display region 51A and an outer display region 51B. The inner display region 51A is located in the display screen 32 inside the operation knob 41, and the outer display region 51B is located in the display screen 32 outside the operation knob 41. A region of the display screen 32 obtained by excluding the inner display region 51A from the entire region of the display screen 32 (in the example of FIG. 1, rectangular region where operational portions 40 are arranged) is entirely or partially defined as the outer display region 51B of the operation knob 41. In the example of FIG. 1, the display region in the vicinity of the outer side of the operation knob 41 is set as the outer display region 51B.

In the same manner, the functional information associated with the operation knob 42 is displayed in at least one of an inner display region 52A and an outer display region 52B. The inner display region 52A is located in the display screen 32 inside the operation knob 42, and the outer display region 52B is located in the display screen 32 outside the operation knob 42. A region of the display screen 32 obtained by excluding the inner display region 52A from the entire region of the display screen 32 (in the example of FIG. 1, rectangular region where operational portions 40 are arranged) is entirely or partially defined as the outer display region 52B of the operation knob 42. In the example of FIG. 1, the display region in the vicinity of the outer side of the operation knob 42 is set as the outer display region 52B.

Optionally, a display region may be allocated in the display screen 32 for the functional information associated with each of the operation buttons 43 to 48 in the same manner as the operation knobs 41 and 42. In one embodiment, the operation buttons 43 to 48 are formed from a transparent resin material, and the regions of the operation buttons 43 to 48 may also function as the region of the display screen 32. For example, the functional information associated with the operation button 43 may be displayed in at least one of an inner display region 53A, which is located in the display screen 32 inside the operation button 43, and an outer display region 53B, which is located in the display screen 32 outside the operation button 43. A region of the display screen 32 obtained by excluding the inner display region 53A from the entire region of the display screen 32 is entirely or partially defined as the outer display region 53B of the operation button 43. In the example of FIG. 1, the display region in the vicinity of the outer side of the operation button 43 is set as the outer display region 53B. The display regions of the operation buttons 44 to 48 may also be set in the same manner as the operation button 43.

Optionally, mode switching buttons 41A and 42A may be arranged inside the operation knobs 41 and 42. The mode switching buttons 41A and 42A are push-type buttons and used to switch between operation modes allocated to the operation knobs 41 and 42. For example, when the mode switching button 41A is pushed, the operation mode of the operation knobs 41 and 42 is switched to a temperature adjustment mode. When the mode switching button 42A is pushed, the operation mode of the operation knobs 41 and 42 is switched to a travel selection mode. FIG. 1 illustrates the operation knobs 41 and 42 in the temperature adjustment mode. In one embodiment, the inner display regions 51A and 52A of the operation knobs 41 and 42 may display, for example, the same functional information (in the example of FIG. 1, temperature set value) in cooperation with the operation of the operation knobs 41 and 42.

Optionally, the operational input device 20 may include operation buttons 61 to 65 attached to the operation panel 22 outside the display screen 32 of the display panel 30. The operation buttons 61 to 65 may also be used to operate various devices (functions) through display control on the display screen 32.

Figure 2:
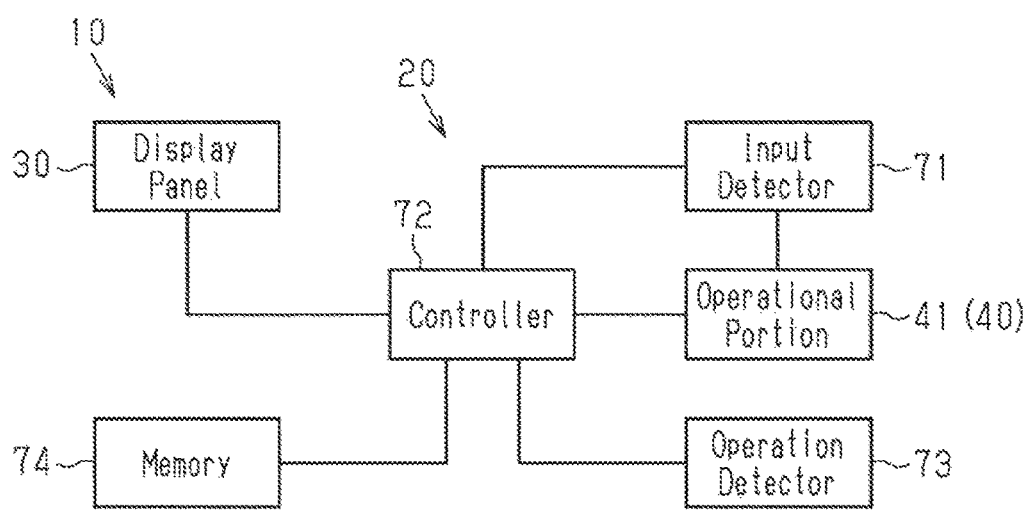
FIG. 2 is a schematic block diagram illustrating part of the electrical configuration of the electronic device illustrated in FIG. 1.

FIG. 2 illustrates part of the electrical configuration of the electronic device 10 illustrated in FIG. 1. The electrical configuration related to one of the operational portions 40, for example, the operation knob 41, will be described hereafter. The electrical configuration related to the operation knob 42 is also the same.

The operational input device 20 includes an input detector 71 and a controller 72. The input detector 71 detects an operation input performed by the user with the operation knob 41 (operational portion 40), and the controller 72 controls the display of the functional information associated with the operation knob 41 on the display screen 32.

In one embodiment, the input detector 71 includes a sensor that detects a conductive object (e.g., fingers of user) contacting or proximate to the operation knob 41. For example, the input detector 71 is a capacitance sensor arranged in the operation knob 41. Alternatively, the input detector 71 may be an infrared sensor arranged in (or proximate to) the operation knob 41. As another option, when the display panel 30 is a touch sensor panel, capacitance sensors arranged in the touch sensor panel may be used as the input detector 71.

The controller 72 determines from the detection signal of the input detector 71 whether or not the user is operating the operation knob 41, in other words, whether or not the user has canceled an operation input. Further, the controller 72 determines from an operation signal of the mode switching button 41A of the operation knob 41 whether or not the mode switching button 41A has been pushed.

The operational input device 20 further includes an operation detector 73 that detects a set value changing operation performed by the user on the operation knob 41. In one embodiment, the operation detector 73 includes a rotation detection sensor that detects rotation of the operation knob 41. The rotation detection sensor may be, for example, a photosensor that includes a light-emitting diode and a phototransistor. Alternatively, the rotation detection sensor may be a magnetic sensor. The controller 72 measures the rotation amount of the operation knob 41 from the detection signal of the operation detector 73 and determines the set value corresponding to the rotation amount of the operation knob 41.

The operational input device 20 further includes a memory 74. The memory 74 stores one or more programs including instructions executable by the controller 72. The controller 72 includes one or more processors and executes operation determination processing and display control processing as described below in accordance with the one or more programs stored in the memory 74.

In one embodiment, when the controller 72 executes the operation determination processing in accordance with the stored program, the controller 72 functions as a determining means that determines whether or not the operation knob 41 (operational portion 40) located on the display screen 32 of the display panel 30 is being operated.

Further, when the controller 72 executes the display control processing in accordance with the stored program, the controller 72 functions as a display control means that controls the display of the functional information associated with the operation knob 41 in accordance with the determination of the determining means. When the operation knob 41 is not being operated, the display control means displays the functional information on the inner display region 51A (first region of display screen 32 inside operation knob 41). Further, when the operation knob 41 is being operated, the display control means displays the functional information on the outer display region 51B (second region of display screen 32 outside operation knob 41). The display control processing will be described in detail later.

Thus, the program executed by the controller 72 includes instructions causing the controller 72 to determine whether or not the operation knob 41 (operational portion 40) is being operated, display the functional information on the inner display region 51A (first region) when the operation knob 41 is not being operated, and display the functional information on the outer display region 51B (second region) when the operation knob 41 is being operated. Such a program may be provided as a non-transitory computer readable storage medium.

The memory 74 further stores display data used to display the functional information associated with the operation knob 41 (the operational portion 40) on the display screen 32 of the display panel 30. When executing the display control processing, the controller 72 reads the display data corresponding to the functional information of the operation knob 41 from the memory 74 and drives the display panel 30.

Figure 3:
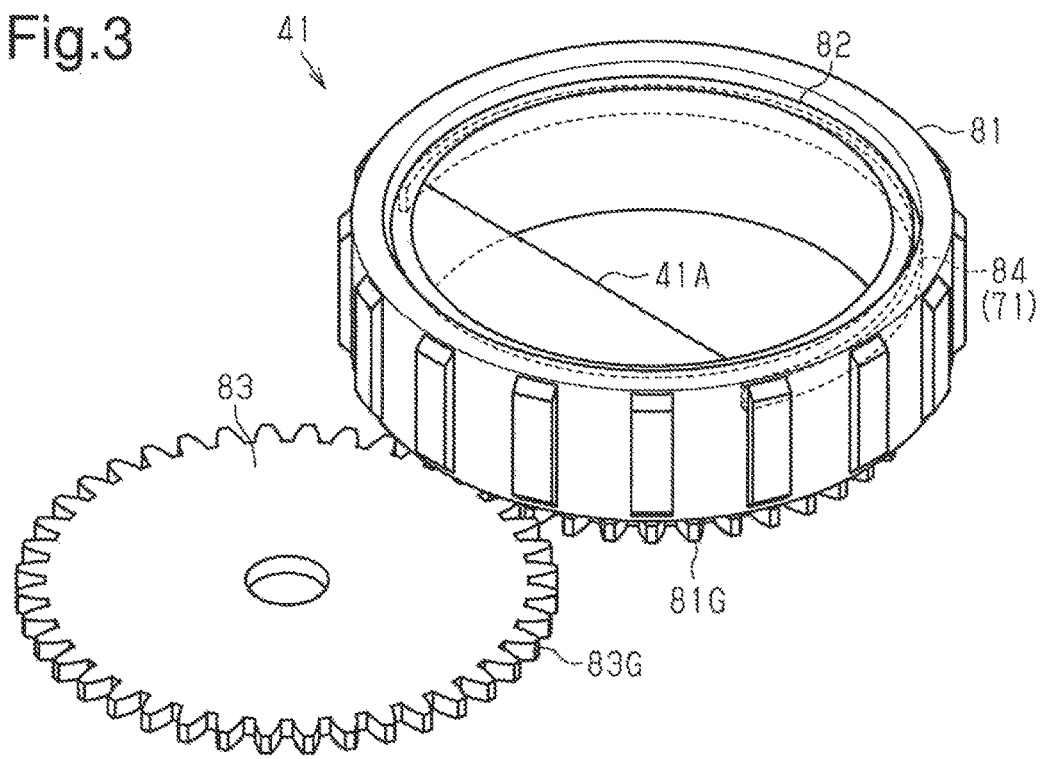
FIG. 3 is a schematic perspective view illustrating an exemplary structure of an operation knob.
Figure 4:
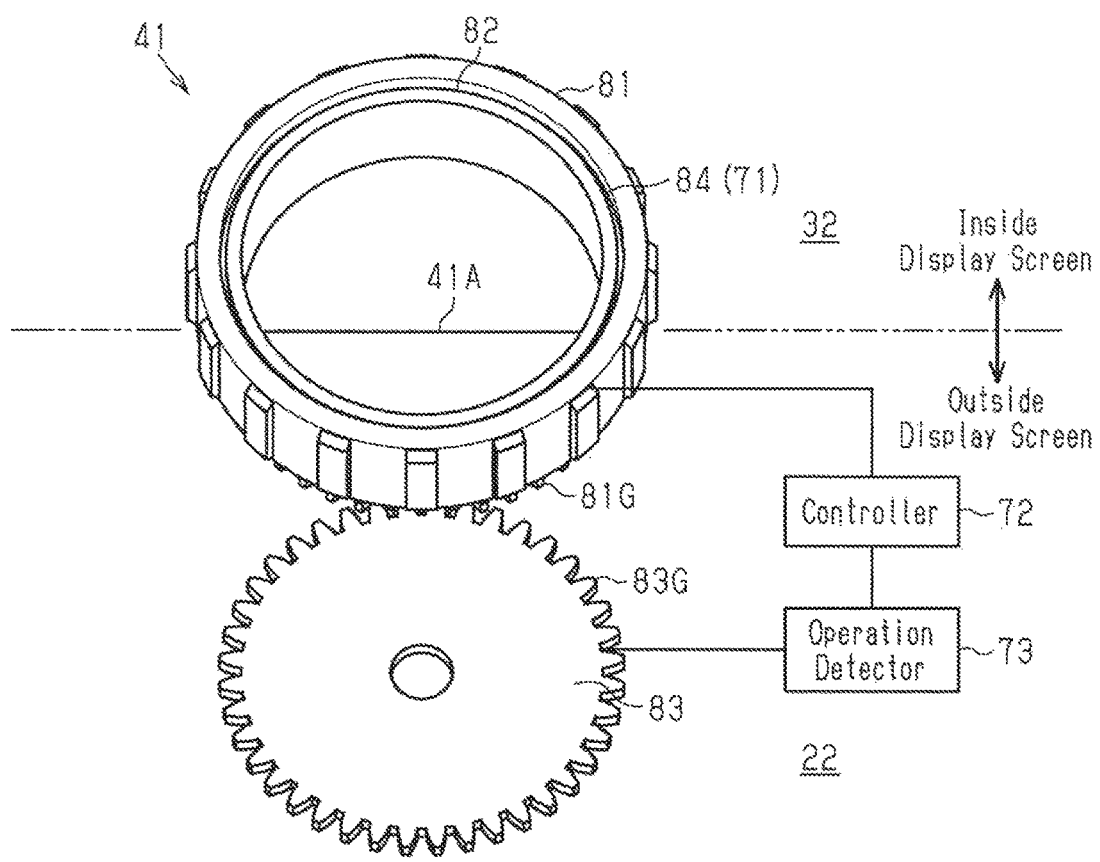
FIG. 4 is a schematic perspective view illustrating an exemplary layout of the operation knob.

FIGS. 3 and 4 schematically illustrate an exemplary structure and layout of the operation knob 41. The operation knob 42 has the same structure and layout as the operation knob 41.

The operation knob 41 includes an outer ring 81 (first ring member), an inner ring 82 (second ring member), and a gear 83. The outer ring 81 and the inner ring 82 are arranged extending over both of the display panel 30 and the operation panel 22 (refer to FIG. 1). The inner ring 82 is located at the inner side of the outer ring 81 and coupled in a non-rotatable manner to the display panel 30 and the operation panel 22. The outer ring 81 is rotatable relative to the inner ring 82.

A sensor electrode 84 is fixed to an outer wall of the inner ring 82. The sensor electrode 84 is, for example, the electrode of a capacitance sensor forming the input detector 71 and electrically connected to the controller 72. FIG. 3 illustrates only one example of the shape of the sensor electrode 84, and the shape and number of the sensor electrode 84 is not particularly limited. For example, instead of the sensor electrode 84, multiple electrodes extending in the axial direction of the inner ring 82 may be arranged at equal intervals in the circumferential direction of the inner ring 82. The controller 72 measures a change in the capacitance produced between the sensor electrode 84 and a conductive object such as the fingers of the user. Then, the controller 72 determines from the change in the capacitance whether or not the fingers of the user are contacting or proximate to the outer ring 81 (operation knob 41).

Although not illustrated in the drawings, the operation knob 41 includes a haptic feedback mechanism that produces haptic feedback, for example, clicks perceived with the fingers when the user rotates the outer ring 81. In one example, the haptic feedback mechanism includes grooves of the outer ring 81, an engagement member engageable with the grooves, and a spring. The grooves are formed in the inner wall surface of the outer ring 81 at fixed intervals in the circumferential direction. The spring urges the engagement member toward the inner wall surface of the outer ring 81. In such a haptic feedback mechanism, when the user rotates the operation knob 41, the urging force of the spring causes the engagement member to engage the grooves one after another to produce clicks perceived with the fingers as the outer ring 81 rotates. The clicking allows the user to intuitively recognize the rotation amount of the operation knob 41.

Optionally, the operational input device may include a voice output device that outputs voice in correspondence with the clicking and/or the display of the selected functional information. Any known structure may be employed as the voice output device. For example, the controller 72 may provide the voice output device with a control signal for generating and outputting voice in correspondence with the operation of the operation knob 41 based on the detection signal from the input detector 71 and/or the detection signal from the operation detector 73. This structure allows the user to further intuitively recognize the operation of the operation knob 41 through the clicking and voice provided in cooperation with the dramatic display on the display screen 32.

The lower end of the outer ring 81 includes first teeth 81G. The gear 83 includes second teeth 83G that mesh with the first teeth 81G. Accordingly, when the outer ring 81 rotates, the first teeth 81G and the second teeth 83G rotate the gear 83.

The operation detector 73, which serves as the rotation detection sensor, is located at a position allowing the rotation of the gear 83 to be detected. In one embodiment, the gear 83 and the operation detector 73 form a rotation detection mechanism. As illustrated in FIG. 4, the rotation detection mechanism (gear 83 and operation detector 73) is arranged in the operation panel 22 at a position separated from the display screen 32 of the display panel 30.

In this manner, the arrangement of the gear 83 at a position separated from the display screen 32 allows the operation detector 73 (e.g., photosensor) to be arranged in an open space inside the operation panel 22 at the position separated from the display screen 32 even when the back side of the display screen 32 has no arrangement space for the operation detector 73. In the example of FIG. 4, the controller 72 is also illustrated at the position separated from the display screen 32. However, the controller 72 may be located at the back side of the display screen 32.

The display control executed by the controller 72 of the operational input device 20 will now be described with reference to FIGS. 5 to 7. The display control of the functional information associated with the operation knob 41 will now be described as a representative example.

Figure 5:
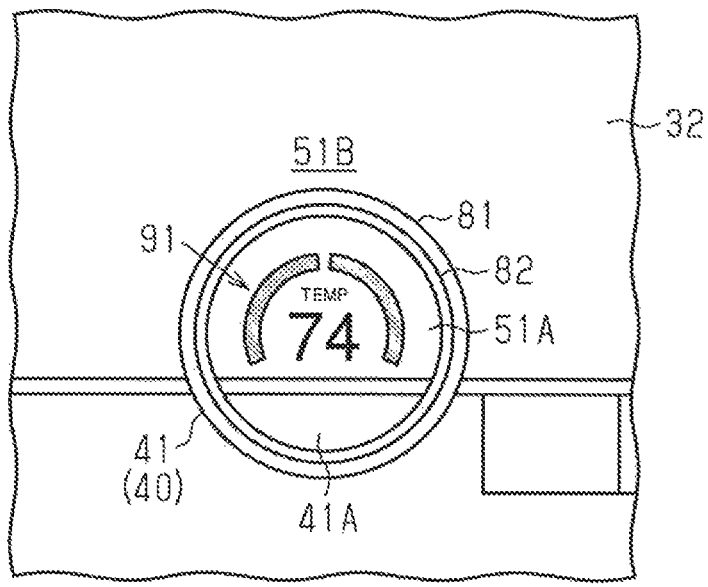
FIG. 5 is a schematic diagram illustrating an example of the display of functional information prior to detection of an operation input.

FIG. 5 illustrates an example of the display of the functional information prior to the detection of an operation input performed with the operation knob 41. Prior to the input detector 71 detecting an operation input performed with the operation knob 41, the controller 72 displays functional information 91 on the inner display region 51A based on the display data stored in the memory 74. Prior to the detection of the operation input, functional information is not displayed on the outer display region 51B.

In the example of FIG. 5, the functional information 91 is displayed as a graphic display in a first display mode combining characters (in this case, "TEMP" indicating temperature), a number (in this case, "74" indicating 74 degrees Fahrenheit that is the current set value), and graphics (in this case, two "arcs"). Further, the functional information 91 is displayed in a first display size that the inner display region 51A can display. The functional information 91 indicates that the functions of a temperature adjustment operational portion are currently allocated to the operation knob 41.

Figure 6:
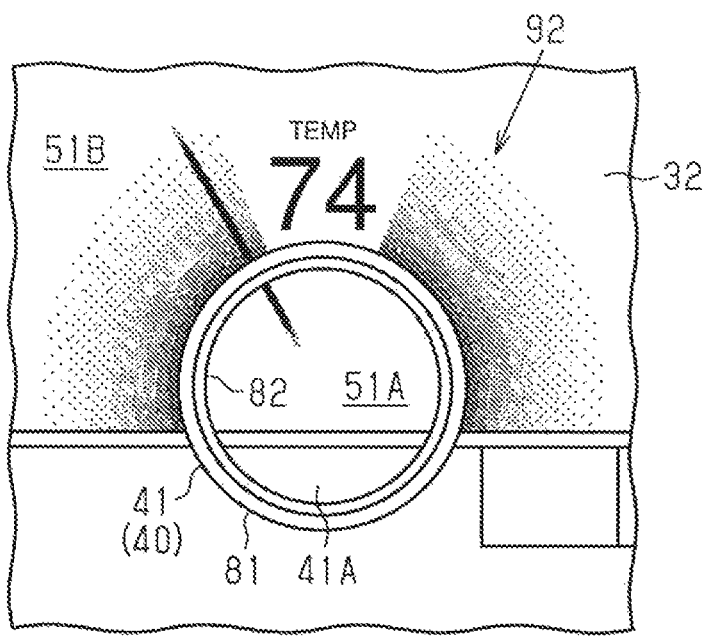
FIG. 6 is a schematic diagram illustrating an example of the display of the functional information during detection of the operation input.

FIG. 6 illustrates an example of the display of the functional information during detection of the operation input performed with the operation knob 41. When the operation input performed with the operation knob 41 is detected by the input detector 71, the controller 72 displays functional information 92 on the outer display region 51B based on the display data stored in the memory 74. Further, in response to the detection of the operation input, the controller 72 suspends the display of the functional information 91 (refer to FIG. 5) on the inner display region 51A. The suspension of the display of the functional information 91 is not limited to immediate suspension of the display of the functional information 91. The suspension of the display may include, for example, gradual disappearance of the functional information 91 before the display is suspended. Alternatively, the suspension of the display may include continuous display of the functional information 91 over a predetermined time (short time) before the display is suspended.

In the example of FIG. 6, the functional information 92 is displayed as a graphic display in a second display mode combining characters ("TEMP"), a number ("74"), and graphics (in this case, two "sectors" that are gradated and a "straight line" displayed at a position corresponding to the current set value). Further, the functional information 92 is displayed in a second display size that is larger than the first display size of the functional information 91 (refer to FIG. 5).

In this manner, when the input detector 71 detects a user operation input as the fingers of the user touch (or approach) the operation knob 41, the controller 72 suspends the display of the functional information 91 on the inner display region 51A and starts displaying the functional information 92 on the outer display region 51B. Thus, the user perceives the functional information 91 on the inner display region 51A as virtually popping out of the operation knob 41. This allows the user to intuitively recognize that the user is operating the operation knob 41. Further, even if the inner display region 51A is hidden by the hand or fingers when the user is operating the operation knob 41, the functional information 92 is displayed on the outer display region 51B. This allows the user to adequately recognize the displayed contents.

Figure 7:
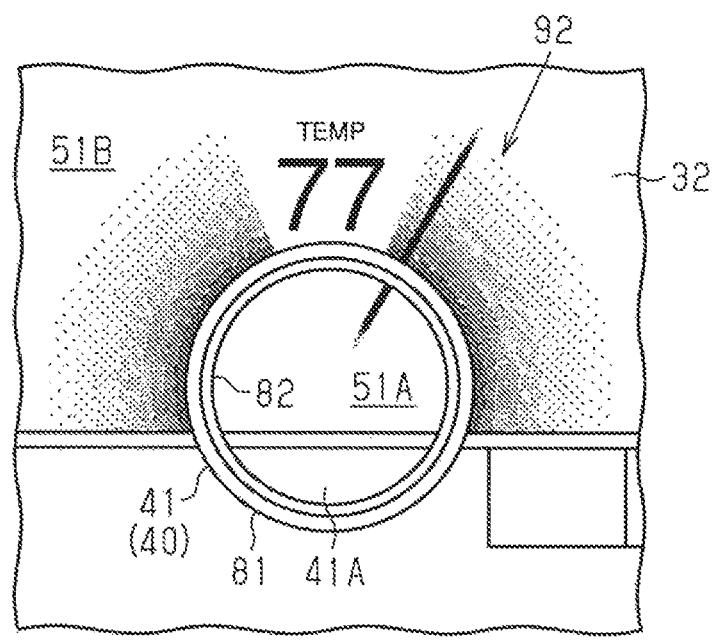
FIG. 7 is a schematic diagram illustrating an example in which the display of functional information is dynamically changed in correspondence with the set value of the operation knob.

FIG. 7 illustrates an example that dynamically changes the display of the functional information 92 of FIG. 6 in correspondence with the set value of the operation knob 41. As long as the input detector 71 is detecting a user operation input (fingers of user contacting or proximate to operation knob 41), the controller 72 continues to suspend the display of the functional information 91 while continuing to display the functional information 92.

In this state, when the user rotates the operation knob 41, the operation detector 73 detects rotation of the operation knob 41. The controller 72 measures the rotation amount of the operation knob 41 based on the detection signal from the operation detector 73 and determines the set value corresponding to the rotation amount of the operation knob 41. The controller 72 dynamically changes the display of the functional information 92 on the outer display region 51B in correspondence with the set value that has been changed by the rotation of the operation knob 41.

In the example of FIG. 7, the number included in the functional information 92 of FIG. 6 is changed from "74" to the changed set value of "77," and the graphics of "the straight line" are changed to a position corresponding to the changed set value. This allows the user to intuitively recognize the changed set value.

Then, when the input detector 71 detects that the operation input performed with the operation knob 41 has been canceled, the controller 72 cancels the display of the functional information 92 on the outer display region 51B and restarts the display of the functional information 91 on the inner display region 51A. That is, the controller 72 displays the functional information 91 of FIG. 5 with the contents that are in correspondence with the changed set value. The cancellation of the display of the functional information 92 is not limited to immediate cancellation of the display of the functional information 92. The cancellation of the display may include, for example, gradual disappearance of the functional information 92 before the display is canceled. Alternatively, the cancellation of the display may include continuous display of the functional information 92 over a predetermined time (short time) before the display is canceled.

Figure 8:
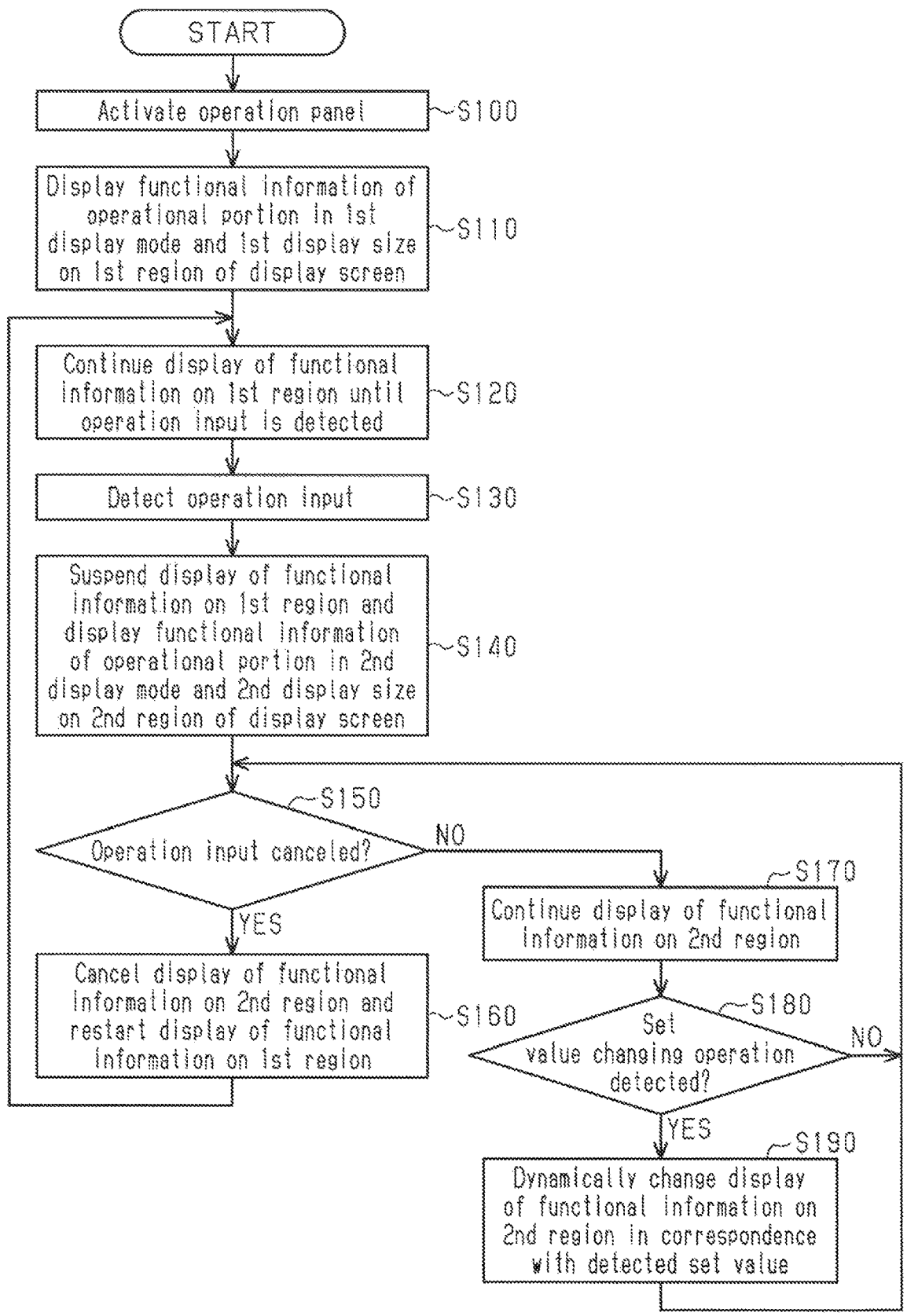
FIG. 8 is a schematic flowchart illustrating an example of display control processing according to one embodiment.

FIG. 8 is a flowchart schematically illustrating exemplary display control processing executed by the controller 72. The display control processing of the functional information associated with the operation knob 41 will be described as a representative example.

In step S100, the operation panel 22 (electronic device 10) is activated. In step S110, the controller 72 displays the functional information 91 of the operation knob (operational portion 40) in the first display mode and the first display size (refer to FIG. 5) on the inner display region 51A (first region) of the display screen 32. Then, the controller 72 continues to display the functional information 91 on the inner display region 51A (first region) until an operation input performed with the operation knob 41 (contact with or proximity of fingers of user) is detected (step S120).

In step S130, the input detector 71 detects an operation input performed with the operation knob 41. In step S140, the controller 72 suspends the display of the functional information 91 on the inner display region 51A (first region) and displays the functional information 92 of the operation knob 41 (operational portion 40) in the second display mode and the second display size (refer to FIG. 6) on the outer display region 51B (second region) of the display screen 32.

In step S150, the controller 72 determines whether or not the operation input performed with the operation knob 41 has been canceled. When the operation input has been canceled (YES in step S150), the controller 72 proceeds to step S160 and cancels the display of the functional information 92 on the outer display region 51B (second region) and restarts the display of the functional information 91 on the inner display region 51A (first region). In this case, the processing returns to step S120.

When the operation input has not been canceled (NO in step S150), the controller 72 proceeds to step S170 and continues the display of the functional information 92 on the outer display region 51B (second region).

Then, when the operation detector 73 detects rotation of the operation knob 41, the controller 72 determines that a set value changing operation has been performed (YES in step S180). In this case, the controller 72 proceeds to step S190 and dynamically changes the display of the functional information 92 on the outer display region 51B (second region) in correspondence with the changed set value (refer to FIG. 7). Then, the processing returns to step S150. The processing also returns to step S150 when a set value changing operation is not performed.

It should be apparent to those skilled in the art that the foregoing embodiments may be implemented in many other specific forms without departing from the scope of this disclosure. Particularly, it should be understood that the foregoing embodiments may be implemented in the following forms.

(A) The display control of the above embodiment may be applied to the display control of the functional information associated with each of the operation buttons 43 to 48. The display control of the functional information associated with the operation button 43 will now be described as a representative example.

The operation button 43 (refer to FIG. 1) on the display screen 32 is a push-type button formed from a transparent resin material, and the region of the operation button 43 also functions as the region of the display screen 32. In this case, the functional information associated with the operation button 43 is displayed on at least one of the inner display region 53A inside the operation button 43 and the outer display region 53B outside the operation button 43.

FIGS. 9A to 9C illustrate an example of the display control when the functions of a volume adjustment operational portion of an on-board audio device are allocated to the operation button 43. In the description hereafter, the same reference numerals are given to those components that are the same as the corresponding components of the above embodiment.

As illustrated in FIG. 9A, the controller 72 displays functional information 93 on the inner display region 53A prior to detection of an operation input performed with the operation button 43. For example, the functional information 93 is a graphic display in a first display mode including the mark of a "speaker." Prior to detection of the operation input, functional information is not displayed on the outer display region 53B.

As illustrated in FIG. 9B, when the fingers of the user touch (or approach) the operation button 43, the input detector in the operation button 43 (e.g., capacitance sensor) detects the operation input. Thus, the controller 72 suspends the display of the functional information 93 on the inner display region 53A and starts the display of functional information 94 on the outer display region 53B. The functional information 94 is a graphic display in the second display mode including the mark of a "speaker" and graphics indicating the current set value (volume level).

A set value changing operation is enabled when the fingers of the user touch (or approach) the operation button 43. Alternatively, a set value changing operation may be enabled when, for example, the operation button 43 is held pushed for a long time. In a state in which the set value changing operation is enabled, the set value (volume level) of the operation button 43 is changed by pushing the operation button 43. Consequently, as illustrated in FIG. 9C, the controller 72 determines the set value based on the operation signal from the operation button 43 and dynamically changes the display of the functional information 94 on the outer display region 53B in correspondence with the set value. In FIGS. 9B and 9C, the size of the mark of "the speaker" on the outer display region 53B is the same as the size of the mark of "the speaker" on the inner display region 53A but may be larger than the size of the mark of "the speaker" on the inner display region 53A.

(B) The display of the functional information on the outer display region (second region) may be, for example, only characters describing the contents of the function that is set (current set value). For example, as illustrated in FIG. 10A, the functions of a windshield defogger are allocated to the operation button 46 (operational portion 40). Prior to detection of an operation input performed with the operation button 46, functional information 95 is displayed on an inner display region 56A. Then, when the operation input performed with the operation button 46 is detected, the functional information 96 is displayed on an outer display region 56B as illustrated in FIG. 10B. The display of the functional information 96 includes only the characters of "Windshield Defogger ON" indicating the current set value.

(C) As illustrated in FIG. 10C, the size of the functional information 96 on the outer display region 56B (second region) may be the same as the size of the functional information 95 (refer to FIG. 10A) on the inner display region 56A (first region).

(D) As illustrated in FIG. 10D, the functional information 96 on the outer display region 56B (second region) may be a simple enlargement of the functional information 95 on the inner display region 56A (refer to FIG. 10A).

(E) As illustrated in FIG. 10E, when the functional information 96 is displayed on the outer display region 56B (second region), the functional information 95 may remain displayed on the inner display region 56A (first region).

(F) The conductive object detected by the input detector 71 is not limited to the hand or fingers of a user and may be a stylus pen or the like.

(G) The operational portions 40 are not limited to the forms of the operation knobs 41 and 42 (rotary-type knobs) and the forms of the operation buttons 43 to 48 (push-type buttons). For example, when the display panel 30 is a touch sensor panel, a certain region of the display screen 32 may be defined as an operational portion.

(H) The configuration of the operation panel 22 and the display panel 30 are not limited to the above embodiment.

(I) When the operation detector 73 can be arranged at the back side of the display screen 32, the gear 83 of the operation knob 41 may be omitted. The same applies to the operation knob 42.

(J) The operation buttons 43 to 48 do not have to be formed from a transparent resin and may be formed from, for example, a colored resin. Alternatively, the operation buttons 43 to 48 may be formed from a material other than resin.

(K) There may be any number of the operational portions 40 (operation knobs 41 and 42 and operation buttons 43 to 48).

(L) The display controls illustrated in FIGS. 9A to 9C and 10A to 10C may be applied to the display control of the operation knobs 41 and 42.

All examples and conditional language recited herein are intended for pedagogical purposes to aid the reader in understanding the principles of the invention and the concepts contributed by the inventors to furthering the art, and are to be construed as being without limitation to such specifically recited examples and conditions, nor does the organization of such examples in the specification relate to an illustration of the superiority and inferiority of the invention. Although embodiments have been described in detail, it should be understood that various changes, substitutions, and alterations could be made hereto without departing from the scope of this disclosure.

The invention claimed is:

1. An operational input device comprising:
    an operational portion located on a display screen of a display panel;
    a controller that determines whether or not the operational portion is being operated and controls display of functional information associated with the operational portion based on the determination; and
    an input detector that detects a conductive object in contact with or located proximate to the operational portion as an operation input performed with the operational portion, wherein
    the controller determines that the operational portion is being operated as long as the input detector is detecting the operation input,
    the controller displays the functional information on a first region of the display screen defined inside the operational portion when the operational portion is not being operated,
    the controller displays the functional information on a second region of the display screen defined outside the operational portion when the operational portion is being operated, and
    cancellation of the operation of the operational portion causes the controller to cancel the display of the functional information on the second region, wherein the controller performs continuous display of the functional information on the second region over a predetermined time in response to the cancellation of the operation of the operational portion.

2. The operational input device according to claim 1, wherein
    the controller displays the functional information on the first region prior to detection of the operation input, and
    the controller displays the functional information on the second region in response to detection of the operation input.

3. The operational input device according to claim 2, wherein the input detector comprises a capacitance sensor arranged in the operational portion.

4. The operational input device according to claim 1, wherein
    the functional information is displayed in a first display size on the first region, and
    when the operational portion is being operated, the controller displays the functional information on the second region with the functional information enlarged to a second display size that is larger than the first display size.

5. The operational input device according to claim 1, wherein
    the functional information is displayed on the first region in a first display mode, and
    when the operational portion is being operated, the controller displays the functional information on the second region in a second display mode that at least partially differs from the first display mode.

6. The operational input device according to claim 1, wherein the controller continuously displays the functional information on the second region while the operational portion is continuously being operated.

7. The operational input device according to claim 6, wherein when the operational portion is operated, the controller suspends the display of the functional information on the first region.

8. The operational input device according to claim 7, wherein the controller performs continuous display of the functional information on the first region over a predetermined time in response to the operation of the operational portion.

9. The operational input device according to claim 8, wherein the controller performs the continuous display of the functional information on the first region over the predetermined time by causing gradual disappearance of the functional information on the first region in response to the operation of the operational portion.

10. The operational input device according to claim 6, wherein when operation of the operational portion is canceled, the controller performs both of cancelling the display of the functional information on the second region and restarting the display of the functional information on the first region.

11. The operational input device according to claim 1, wherein the controller performs the continuous display of the functional information on the second region over the predetermined time by causing gradual disappearance of the functional information on the second region in response to the cancellation of the operation of the operational portion.

12. The operational input device according to claim 1, further comprising:
    an operation detector that detects a set value changing operation performed with the operational portion,
    wherein the controller dynamically changes the display of the functional information on the second region in correspondence with a set value changed by the set value changing operation.

13. The operational input device according to claim 12, wherein:
    the operational portion includes a ring-shaped rotary-type operation knob;
    the first region is defined inside the operation knob;
    the second region is defined outside the operation knob;
    the operation knob includes
        a ring that includes first teeth,
        a gear that includes second teeth that mesh with the first gear of the ring;

the operation detector includes a rotation detection sensor that detects rotation of the gear; and the gear and the rotation detection sensor are located at a position separated from the display screen.

14. The operational input device according to claim 1, wherein the operational portion comprises a plate-shaped push-type operation button, the first region is defined inside the operation button, and the second region is defined outside the operation button.

15. The operational input device according to claim 1, wherein the functional information is displayed as a graphic display including at least one of a character, a number, a graphic, and a mark.

16. A controller for an operational input device, the controller comprising:

a controller for determining whether or not an operational portion located on a display screen of a display panel is being operated, wherein the controller for determining determines that the operational portion is being operated as long as an input detector is detecting an operation input performed with the operation portion, the input detector detecting a conductive object in contact with or located proximate to the operational portion as the operation input; and the controller for controlling display of functional information associated with the operational portion based on the determination of whether or not the operational portion is being operated, wherein the controller for controlling display of functional information displays the functional information on a first region of the display screen defined inside the operational portion when the operational portion is not being operated, the controller for controlling display of functional information displays the functional information on a second region of the display screen defined outside the operational portion when the operational portion is being operated, and cancellation of the operation of the operational portion causes the controller for controlling display of functional information to cancel the display of the functional information on the second region, wherein the controller for controlling display of functional information performs continuous display of the functional information on the second region over a predetermined time in response to the cancellation of the operation of the operational portion.

17. A non-transitory computer readable storage medium that stores one or more programs executable by one or more processors, the one or more programs comprising instructions causing the one or more processors to perform:

determining whether or not an operational portion located on a display screen of a display panel is being operated, the determining includes determining that the operational portion is being operated as long as an input detector is detecting an operation input performed with the operation portion, the input detector detecting a conductive object in contact with or located proximate to the operational portion as the operation input;

displaying functional information associated with the operational portion on a first region of the display screen defined inside the operational portion when the operational portion is not being operated;

displaying the functional information on a second region of the display screen defined outside the operational portion when the operational portion is being operated; and canceling the display of the functional information on the second region in response to cancellation of the operation of the operational portion, wherein the canceling the display of the functional information includes causing the one or more processors to performs continuous display of the functional information on the second region over a predetermined time in response to the cancellation of the operation of the operational portion.

18. The controller for an operational input device according to claim 16, wherein the controller for controlling display of functional information performs the continuous display of the functional information on the second region over the predetermined time by causing gradual disappearance of the functional information on the second region in response to the cancellation of the operation of the operational portion.

19. The non-transitory computer readable storage medium according to claim 17, wherein the continuous display of the functional information on the second region over a predetermined time includes causing the one or more processors to performs gradual disappearance of the functional information on the second region in response to the cancellation of the operation of the operational portion.

* * * * *